Nov. 14, 1967   N. S. STOCKDALE   3,353,024
CONTROL CIRCUITRY FOR AN ELECTRONIC CURVE FOLLOWER
Filed Jan. 25, 1965   4 Sheets-Sheet 1

*INVENTOR*
NORMAN S. STOCKDALE

BY Donald F. Voss
ATTORNEY

United States Patent Office 3,353,024
Patented Nov. 14, 1967

3,353,024
CONTROL CIRCUITRY FOR AN ELECTRONIC
CURVE FOLLOWER
Norman S. Stockdale, Rochester, Minn., assignor to International Business Machines Corporation, New York, N.Y., a corporation of New York
Filed Jan. 25, 1965, Ser. No. 427,874
6 Claims. (Cl. 250—202)

This invention relates to control circuitry and more particularly to control circuitry for an electronic curve follower to enable the same to follow the edges of a plurality of curves sequentially.

This invention provides apparatus for locating the curve to be followed, for determining when a curve has been completely followed and for finding the next curve to be followed.

The invention finds particular utility in character recognition machines utilizing an electronic curve follower for following along the edge of the characters to gather information for identifying the characters. The particular way in which the curve follower operates does not form a part of this invention.

Accordingly, a principal object of the invention is to provide improved control apparatus for controlling an electronic curve follower.

Another very important object of the invention is to provide improved control apparatus for an electronic curve follower which is capable of locating the curve to be followed, determining when the curve has been completely followed and finding the next curve to be followed.

Still another object of the invention is to provide control apparatus for an electronic curve follower which permits curves to be followed sequentially.

The foregoing and other objects, features and advantages of the invention will be apparent from the following more particular description of a preferred embodiment of the invention, as illustrated in the accompanying drawings.

Figure 3A:
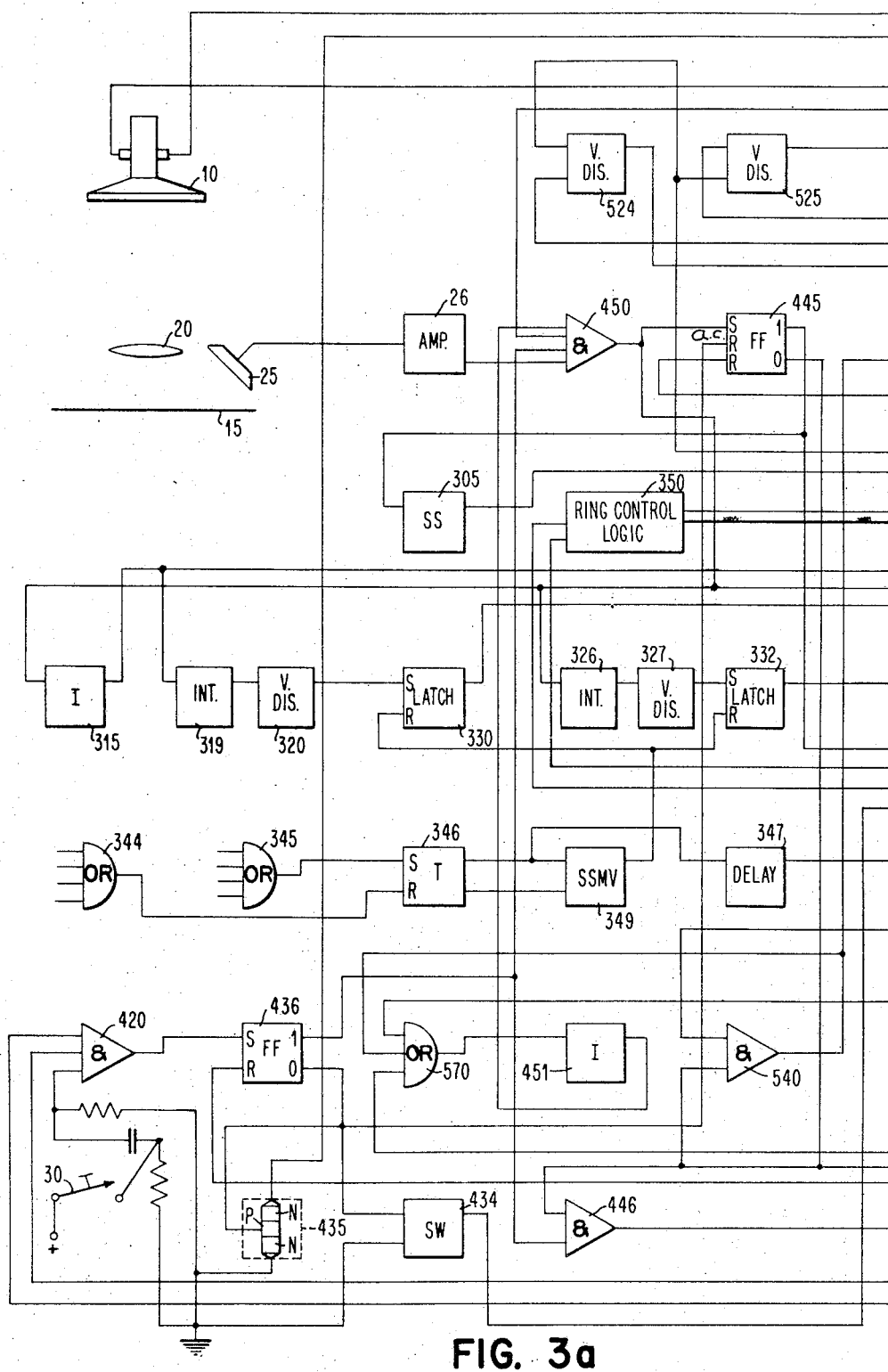
Figure 3B:
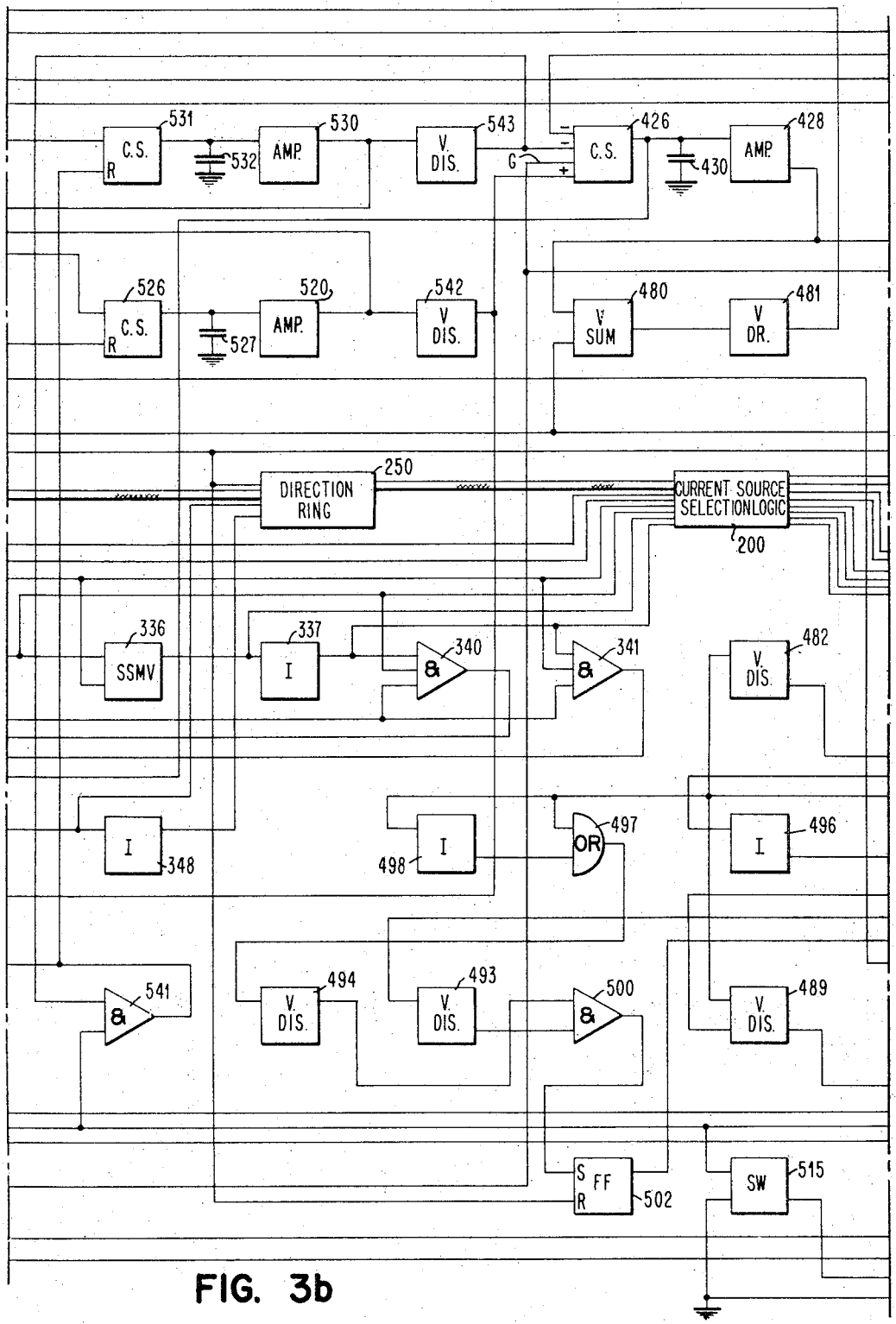
Figure 3C:
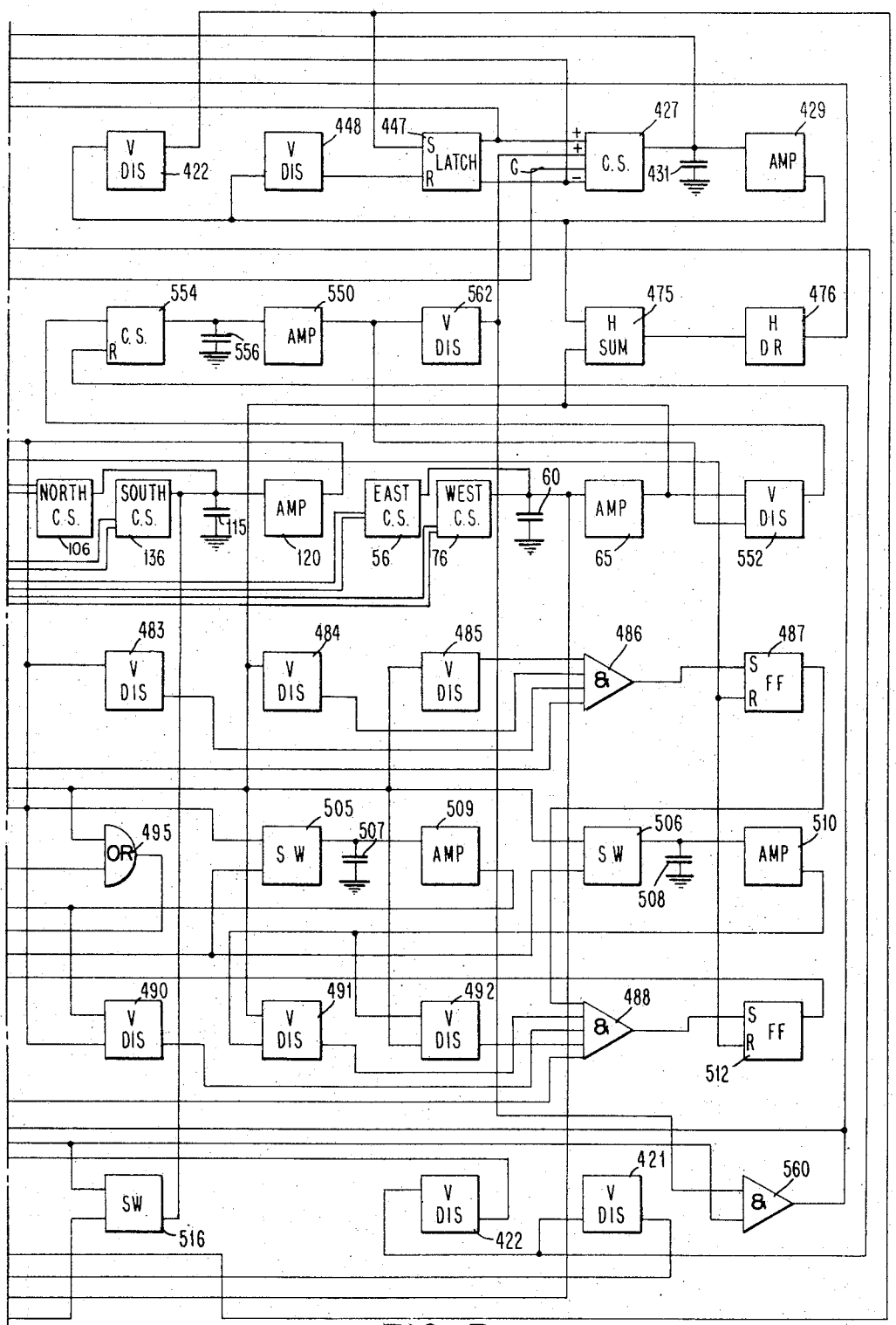

FIGS. 3a, 3b and 3c with FIG. 3b disposed to the right of FIG. 3a and FIG. 3c disposed to the right of FIG. 3b taken together, are a schematic logic diagram embodying the invention.

GENERAL

Figure 1:
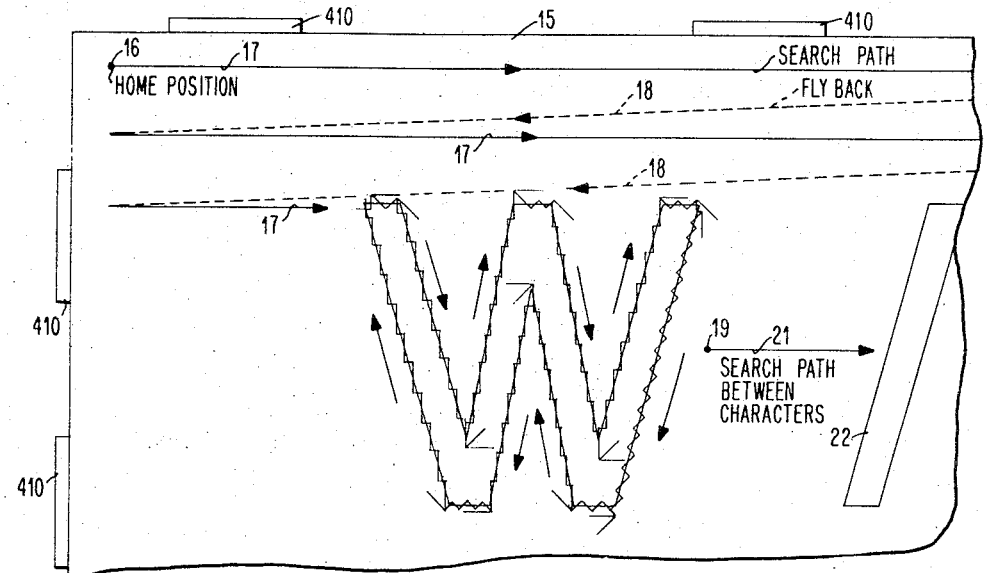
FIG. 1 is a diagram illustrating the paths taken by the beam of the scanner for locating the curve to be followed, for following the curve and for locating the next curve to be followed.

With reference to the drawings, and particularly to FIG. 1, document 15 is registered in the reading position by means of scanner registration stops 410. The beam of the scanner or cathode ray tube 10, FIG. 3a, is at the Home position 16, FIG. 1.

The search for the curve to be followed, which, in this instance, is illustrated as a W, is initiated by a Start operation. The Start operation causes the beam to move from left to right along the Search path 17. When the beam reaches the extreme right hand edge of the face of the cathode ray tube 10, it is caused to return or fly back along the path 18. As the beam moves along the Search path 17, it moves in a horizontal direction only. However, when it moves along the fly back path 18, it is moving both horizontally and vertically. During this Search operation, as it will be seen shortly, only the Format Integrators for controlling the movement of the beam are operative.

After the beam engages the curve during the Search mode, the operation switches to a Follower mode and the Follower Integrators for controlling the beam become active while the Format Integrators remain at the level for deflecting the beam at the time it engaged the curve.

Figure 2:
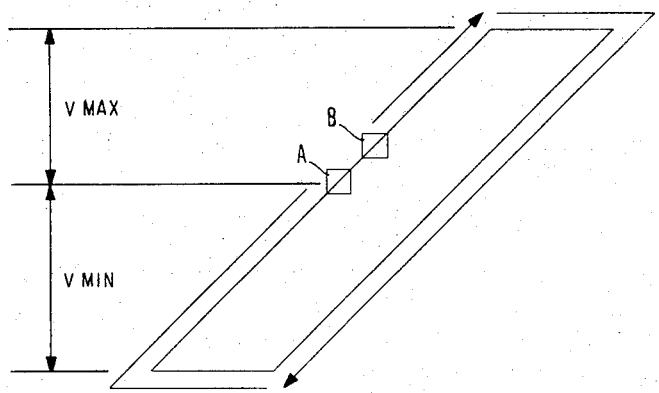
FIG. 2 is a diagram schematically illustrating the way for determining when the curve has been completely followed.

The boundaries of the A box, FIG. 2, are immediately established upon switching to the Follower mode. The beam is then allowed to leave the A box and when the beam moves a predetermined horizontal and vertical distance away from the A box, as commensurate with the drift and other errors of the system, it will enter the B box. Actually, since the location of the A box is determined by where the beam engages the curve during the Search mode, it can be anywhere along the height of the curve. However, the B box is always located a predetermined vertical and horizontal distance away from the A box. The locations of the A and B boxes are stored at this time and will be used as references for determining when the beam has completed the following of the curve. The following of the curve is completed only if the beam re-enters the A box and then the B box in that sequence. This, of course, can only take place after the boundaries of the A and B boxes have been established.

During the Follower operation, the maximum or total vertical excursions of the beam in opposite directions from the level established by the Format Integrators are developed. Also, the maximum or total horizontal excursion of the beam to the most right hand edge of the curve is stored. This latter information is used for positioning the beam to an improved position for searching for the next curve to be followed after the Follower mode terminates. Essentially, the vertical coordinate of the new Search starting point is approximately at the vertical center of the previously followed curve. The Search and Follower modes continue alternately until the scanning limits of the cathode ray tube 10 are exceeded. At that time, the Stop operation comes into play and the beam is returned to the Home position.

This completes the general description of the invention. From this description, it is seen that the beam starts from a Home position and then searches for the curve to be followed. When the curve has been found, the Format Integrators remain at their last level and the Follower Integrators become operative. The boundaries of the A and B boxes are established and stored. During the Follower mode, the Format sequencing circuits are operative to develop beam positioning signals for positioning the beam to a new Search position after the Follower mode terminates. The Format Integrators then become operative again while the beam searches for the next sequential curve to be followed. The action repeats until all curves are followed and if the limits of the cathode ray tube are exceeded, a Stop operation takes place and the beam is returned to the Home position.

DETAILED DESCRIPTION

Start operation

With the document 15 registered relative to the cathode ray tube 10, FIG. 3, a Start operation is initiated by depressing ready key 30. It should be noted that at the time the ready key 30 is depressed, the beam is already in the Home position 16 and the Horizontal Format Integrator, consisting of current sources 427 and capacitor 431, and the Vertical Format Integrator, consisting of current sources 426 and capacitor 430, are reset. This is because the Start-Stop flip flop 436 is initially in the reset or Stop condition and thus switches 434 and 435 reset the Vertical and Horizontal Format Integrators respectively. The ready key 30, upon being depressed, completes a circuit from a positive potential to the input of a logical AND circuit 420. The other inputs to logical AND circuit 420 are satisfied at this time because the beam is in the Home position and hence voltage discriminator 422, for determining when the beam is at the Horizontal Home coordinate position, has an up or One output thus providing an up input to logical AND circuit 420. Similarly, voltage discriminator 421 for determining when the beam is in the Vertical Home coordinate position has an up output. Thus, at this time, all inputs to logical AND circuits 420 are satisfied and therefore it passes a signal for setting Start-Stop flip flop 436. With flop flop 436 set, the Start mode is set into operation and logical AND circuit 446 is thus conditioned.

Search operation

The Search-Follow flip flop 445 is in the reset or Search state at this time. Its reset output is connected to an input of logical AND circuit 446. Accordingly, logical AND circuit 446 provides an output signal at this time for conditioning the Vertical and Horizontal Format Integrators for operation. This is accomplished by turning ON the gates of the current sources 426 and 427 respectively. Although the gate of current source 426 is ON at this time, there are no inputs present to operate any of the current sources 426. With the beam in the Horizontal Home coordinate position, discriminator 422 provides a signal for setting latch 447. Hence, one of the positive current sources of current sources 427 is operative to drive the beam horizontally to the right. If the beam does not encounter the curve or character on the first horizontal searth path to the right before reaching the right hand boundary of the scanner 10, voltage discriminator 448 provides an output for resetting latch 447, thus turning on the negative current source of current sources 427 and also turning on one of the negative current source of current sources 426. With these negative current sources turned on, the beam is deflected simultaneously horizontally to the left and vertically downward until the beam crosses the horizontal left boundary at which time voltage discriminator 422 has an output for again switching latch 447 to the set state. With the latch 447 again set, the corresponding positive current source of current sources 427 is operative for driving the beam horizontally to the right. Of course, none of the current sources of current sources 426 will be operative at this time. This action continues until the curve is engaged. It should be noted that during fly back of the beam, latch 447 is in the reset state and therefore logical AND circuit 450 cannot be conditioned to pass a signal to switch flip flop 445 into the Follower state even if a curve to be followed were engaged by the beam during fly back.

When the beam engages a curve, it causes photomultiplier 25 to develop an output signal. This output signal is amplified by amplifier 26 and passed to logical AND circuit 450. If the beam engages the curve while moving along the search path from left to right, the other inputs to logical AND circuit 450 are satisfied at this time and hence, a signal is passed by logical AND circuit 450 to set the Search-Follow flip flop 445. With the flip flop 445 set, the operation switches into the Follower mode and singleshot multivibrator 305 is fired to initialize the direction latch ring 250, to hold the flip flops 487 and 512 reset and to reset flip flop 502. Flip flops 487 and 512, as it will be seen shortly, function in the determination that the curve has been completely followed. Accordingly, to initiate Follower action, it is necessary to hold these flip flops reset. Flip flop 502 when set operates switches 505 and 506 for controlling the storing of the coordinates for the B box. Hence, it is also held reset at this time. The flip flop 445 also conditions logical AND circuits 340 and 341 which provide control signals to ring logic control 350 for controlling the direction ring 250. The direction ring 250 controls the current source deflection selection logic 200 which controls the Follower Integrators consisting of current sources 56, 76, 106, 136 and capacitors 60 and 115. The function and operation of the deflection selection logic 200, the direction ring 250 and the ring control logic 350 are described in copending application Ser. No. 372,497, filed June 4, 1964, for Electronic Curve Follower by N. S. Stockdale and assigned to the same assignee of this application.

With the Search-Follow flip flop 445 set, the input conditions to logical AND circuit 446 are no longer satisfied and thus the gates of current sources 426 and 427 are down or OFF. Also, switches 515 and 516 are no longer operative for holding the capacitors 60 and 115 in the discharged state.

Although the gates to current sources 426 and 427 are down, the capacitors 430 and 431 are not discharged and therefore, amplifiers 428 and 429 provide input levels to vertical and horizontal summers 480 and 475, respectively. Horizontal and vertical summers 475 and 480 also have inputs from the amplifiers 65 and 120 respectively. Thus, when the operation is in the Follower mode, the beam will be deflected as the output signals from the horizontal and vertical summers 475 and 480 operate the drivers 476 and 481 respectively.

A box–B box defining and storage circuitry

In order to determine the boundaries of the A and B boxes of FIG. 2, the output of amplifier 65 is connected to inputs of voltage discriminators 484, 485, 491 and 492 and the output of amplifier 120 is connected to inputs of voltage discriminators 482, 483, 489 and 490. Voltage discriminators 482 and 483 determine the lower and upper boundaries of box A respectively. Discriminators 484 and 485 determine the left and right hand boundaries of box A respectively. The discriminators 482, 483, 484 and 485 are all referenced to ground and therefore, they define a region enclosing the beam when the capacitors 60 and 115 are held discharged or reset by the switches 515 and 516. Hence, the beam is initially contained in box A when starting the Follower mode of operation.

Discriminators 482, 483, 484 and 485 have their outputs connected to inputs of logical AND circuit 486. The output of logical AND circuit 486 is connected to the set input of flip flop 487. However, flip flop 487 will not be switched at this time because the singleshot multivibrator 305 is holding the flip flop 487 reset. This permits the beam to move out of box A and into box B.

The boundaries of the B box are defined by discriminators 498, 490, 491, 492. However, the B box must be displaced from the A box horizontally and vertically by distances which exceed minimum values commensurate with the drift and other errors of the system. The distance between the boxes A and B is defined by voltage discriminators 493 and 494. The output of amplifier 65 is also connected to inputs of logical OR circuit 495 and inverter 496. The output of logical OR circuit 495 is essentially the output of amplifier 65 rectified and is applied to voltage discriminator 493. Similarly, the output of amplifier 120 is connected to inputs of logical OR circuit 497 and inverter 498. The output of inverter 498 is also connected to logical OR circuit 497 and thus the rectified output of amplifier 120 is fed into discriminator 494. Logical AND circuit 500 functions to determine when the voltage discriminators 493 and 494 have both switched. Until the discriminators 493 and 494 are satisfied, the signal from amplifiers 65 and 120 pass to switches 506 and 505 respectively to charge capacitors 508 and 507 respectively. When the inputs to discriminators 493 and 494 equal the constants within the discriminators, the input conditions to logical AND circuit 500 are satisfied and flip flop 502 is consequently switched to the set state. With the flip flop 502 in the set state, switches 505 and 506 are turned off and thus the horizontal and vertical distances of which the B box must be displaced from the A box are stored.

These stored values are used as references. The output of amplifier 509 is applied to lower input of discriminator 489 and to the upper input of discriminator 490. The upper and lower inputs to discriminators 489 and 490 are connected to the output of amplifier 120. It should be noted that the discriminators 489 and 490 have internal biases which are set such that these discriminators switch their outputs when the levels are above and below the level established by that of capacitor 507. Thus discriminators 489 and 490 define the lower and upper boundaries of box B. Similarly, discriminators 491 and 492 have their lower and upper inputs connected to the output of amplifier 510 and have their upper and lower inputs connected to the output of amplifier 65. Discriminators 491 and 492 also have internal biases which are set such that they switch when the level is to the left and right of the level set by capacitor 508. Thus, voltage discriminator 491 defines the left boundary and voltage discriminator 492 defines the right boundary of the B box.

The outputs of discriminators 489, 490, 491 and 492 are connected to inputs of logical AND circuit 488. Logical AND circuit 488 also has an input connected to the set output of flip flop 487. Flip flop 487 can only be set when the beam is in the A box and the singleshot multivibrator 305 does not have an output for holding the flip flop 487 reset. Hence, when the beam leaves the A box and enters the B box and after the limits of the B box have been defined, the inputs to logical AND circuit 488 will not be satisfied because flip flop 487 is still in the reset state. Accordingly, the beam can leave the B box in the Follower mode.

The beam will be caused to follow the curve under control of the direction ring 250 as described in the referenced Stockdale patent application. As the beam follows around the curve, if it should enter the B box at any time prior to entering the A box, there would still not be an output from logical AND circuit 488. However, after the beam moves out of the B box and follows around the curve and re-enters into the A box, the input conditions to logical AND circuit 486 are satisfied and flip flop 487 will be set. The beam will still follow the curve and as it enters into the B box, the input conditions to logical AND circuit 488 become satisfied. Thus, the flip flop 512 is set. With the flip flop 512 set, the Search-Follow flip flop 445 is reset and switches from the Follower mode into the Search mode.

With the Search-Follow flip flop 445 in the Search mode, switches 515 and 516 are operable for resetting the follower current sources 56, 76, 106 and 136. Additionally, the inputs to logical AND circuit 446 are satisfied and thus current sources 426 and 427 are gated ON.

*Search sequencing circuits*

At this time, the beam will be caused to move from the B box to a new search point which is to the right of the curve just followed and approximately at a central point with respect to the upper and lower boundaries of the curve just followed. It will be recalled that the beam engaged the previously followed curve at some level with respect to the height thereof. Further, the beam then moved about the curve and in doing so, it moved vertically and away from this level and back toward this level. The beam moved away from and towards this level when in the Follower mode under control of current sources 106 and 136. These distances can be thought of as being maximum and minimum vertical distances. These distances correspond to the distances from the position or level where the beam engages the curve to the top and bottom of the curve respectively. The magnitudes of these distances can vary, i.e., the magnitude of the so-called maximum distance can be greater or less than the magnitude of the minimum distance. In order to approximately position the beam to the vertical center of the next curve to be followed, the total vertical deflection distances in both directions away from the level at which the beam engaged the curve are subtracted from each other and the result is divided by two. Therefore, since one total deflection distance will usually be greater than the other, then $(\Delta YMAX - \Delta YMIN)/2$ provides the vertical coordinate position that the beam will have as a new search starting position. To derive these quantities, i.e. $\Delta YMAX/2$ and $\Delta YMIN/2$, the output of amplifier 120 is connected to the upper and lower inputs of voltage discriminators 524 and 525 respectively. Voltage discriminator 524 has its lower input connected to the output of amplifier 520. When the output level of the amplifier 120 exceeds that of amplifier 520, discriminator 524 turns on the positive current source of current source 526 which continues to run until the output of the amplifier 520 reaches the level of amplifier 120. The connection from amplifier 120 to voltage discriminator 525 is opposite from that of voltage discriminator 524. Voltage discriminator 525 has its upper input connected to the output of amplifier 530. Thus, when the output of amplifier 530 exceeds the output of amplifier 120, voltage discriminator 525 operates the negative current source of current source 531 which continues to operate until the output of amplifier 530 reaches the level of amplifier 120.

The subtraction of these two quantities is performed by concurrent operation of positive and negative current sources of current sources 426 during the reset time of current sources 526 and 531. Current sources 526 and 531 are reset by the output signals from logical AND circuits 540 and 541 respectively. Logical AND circuits 540 and 541 each has an input connected to the reset output of the Search-Follow flip flop 445. Logical AND circuit 540 also has an input connected to the output of voltage discriminator 542 while logical AND circuit 541 has an input connected to the output of voltage discriminator 543. Negative and positive current sources of current sources 526 and 531 respectively, are turned on as a result of output signals from AND circuits 540 and 541 and these negative and positive current sources operate until discriminators 542 and 543 switch. During this time, voltage discriminators 542 and 543 will be operating the positive and negative current sources of current sources 426 respectively. By adjusting the current of current sources 426 to be half that of current sources 531 and 526, the added charge placed upon capacitor 430 is equal to half the difference of the charges held by capacitors 527 and 532.

The furthest point that the beam moves horizontally to the right is determined by comparing the output of amplifier 65 with the output from amplifier 550 by means of discriminator 552. When the output of amplifier 65 exceeds that of amplifier 550, discriminator 552 turns on current source 554 which will operate until the output of the amplifier 550 equals the output of the amplifier 65. The storage circuit comprising current source 554, capacitor 556 and high impedance amplifier 550 is reset by logical AND circuit 560. Logical AND circuit 560 has an input connected to the output of voltage discriminator 562 and an input connected to the reset output of flip flop 445. When there is an output from logical AND circuit 560, the negative current source in current source 554 operates and during this time, discriminator 562 operates a positive current source of current sources 427 thus placing a charge on capacitor 431 which is equal to the maximum displacement that the beam made while being deflected in the Follower mode by current sources 56 and 76. This charge on capacitor 431 then provides a level signal for moving the beam from the B box horizontally to the right.

While the beam is moving to the new search position, it necessarily has to cross the curve it just followed. Consequently, in order to prevent the beam from re-following the same curve, it is necessary to prevent switching the flip flop 445 into the Follower mode while the beam is being deflected to the new search position. This function is performed by logical OR circuit 570 and inverter 451. The logical OR circuit 570 has inputs connected to the outputs of logical AND circuits 540, 541 and 560. The output of logical OR circuit 570 is connected to the input of inverter 451 which has its output connected as an input to logical AND circuit 450. Hence, during the time the beam is being deflected to the new search position, one of the logical AND circuits 540, 541 and 560 will have an output and therefore, the output of inverter 451 will be down to de-condition logical AND circuit 450 and thus the Search-Follow flip flop 445 will not be switched into the Follower mode even though the beam is moving left to right and crossing the curve whereby there is an output from photomultiplier 25. After the beam arrives at the new search position, 19 in FIG. 1, the Search mode continues until the beam engages the next sequential curve to be followed.

When the beam is at position 19 of FIG. 1, there will no longer be an output from logical OR circuit 570 and thus the output from inverter 451 will condition logical AND circuit 450 whereby when the beam moves along search path 21 and engages the next sequential curve to be followed, photomultiplier 25 will develop an output signal which is passed by amplifier 26 to logical AND circuit 450. Logical AND circuit 450 is conditioned at this time to pass a signal to switch flip flop 445 into the Follower mode. The previously described action then continues until all characters have been followed.

Voltage discriminators 421 and 423 determine the limits of the scan window in the vertical direction. Voltage discriminator 423 determines when the beam has reached the bottom of the scan window and provides an output signal at that time to reset the Start-Stop flip flop 436. With the Start-Stop flip flop 436 reset, the beam is sent to the Home position as switches 434 and 435 reset the Format Integrators consisting of current sources 426 and capacitor 430, and current sources 427 and capacitor 431.

From the foregoing, it is seen that the invention provides control apparatus for positioning the beam of the scanner to the Home position. Thereafter, upon depression of the ready key 30 the Search mode becomes operative and the beam searches for the curve. The level at which the beam engages the curve is stored and the operation switches into the Follower mode. With the operation in the Follower mode, the A and B boxes are established and the coordinates thereof are stored. The maximum vertical excursions away from the level at which the curve was engaged are stored. Also, the maximum horizontal excursion of the beam to the right as the curve is followed is stored. The completion of the Follower mode is determined when the beam re-enters the A box and then enters the B box. The operation then switches into the Search mode and the beam moves across the curve it had just followed to a new search position just to the right and at approximately the vertical center of the curve just followed. The Search mode continues until the next sequential curve is engaged and then the operation switches into the Follower mode. The aforedescribed sequence of events continues until all curves are followed and the beam reaches the lower edge of the scan window. When this latter event occurs, the beam is re-positioned to the Home position.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for controlling the beam of an electronic curve follower comprising:
   means for defining a first rectangular area in terms of voltage levels about the beam starting position for following a curve;
   means for defining a second rectangular area displaced from said first rectangular area at predetermined vertical and horizontal distances, said second rectangular area being defined in terms of voltage levels; and
   means for providing a signal indicative that the beam has completely followed said curve when said beam re-enters said first and second rectangular areas successively.

2. Apparatus for controlling the beam of an electronic curve follower comprising:
   a control element having two bistable states, one state for controlling said curve follower in a Search mode and another state for controlling said curve follower in a Follower mode;
   means responsive to said control element being in said one state for repeatedly deflecting the beam of said curve follower horizontally to the right of a Home position and thereafter upon reaching a predetermined limit without engaging the curve, for deflecting said beam vertically downward and horizontally to the left to a predetermined limit until said beam engages said curve;
   means operatively connected to switch said control element from said one to said another state upon said beam engaging said curve while moving horizontally to the right;
   means for defining a first area in terms of voltage levels around the point of engagement by the beam with the curve;
   means for defining a second area in terms of voltage levels where said second area is displaced predetermined horizontal and vertical distances from said first area; and
   means responsive to said beam re-entering in sequence said first and second areas for switching said control element from said another state to said one state.

3. In a scanning system having a scanning beam which traces the outline of patterns on a scan surface, means for detecting the completion of a scanning cycle, comprising in combination:
   first location determining means for establishing the limits of a first location on the periphery of a pattern being scanned;
   second location determining means for establishing the limits of a second location on the periphery of a pattern being scanned; and
   sequence detecting means governed by said first and second location determining means for detecting the passage of said scanning beam in a predetermined sequence through the limits established by said first and second location determining means.

4. Apparatus for controlling the beam of an electronic curve follower comprising:
   a control element having two bistable states, one state for controlling said curve follower in a search mode and another state for controlling said curve follower in a follower mode;
   means responsive to said control element being in said one state for deflecting the beam of said curve follower along search paths until said beam engages said curve;
   means operatively connected to switch said control element from said one state to said another state upon said beam engaging said curve;
   means for defining a first area in terms of voltage levels around the point of engagement by the beam with said curve;
   means for defining a second area in terms of voltage levels where said second area is displaced predetermined horizontal and vertical distances from said first area; and
   means responsive to said beam reentering in sequence said first and second areas for switching said control element from said another state to said one state.

5. The apparatus of claim 4 further comprising:
   means for preventing said control element from switching from said one to said another state any time said beam engages the curve just followed while moving along a search path.

6. Apparatus for controlling the beam of an electronic curve follower comprising:

a control element having two bistable states, one state for controlling said curve follower in a search mode and another state for controlling said curve follower in a follower mode;

means responsive to said control element being in said one state for deflecting the beam of said curve follower along search paths until said beam engages said curve;

means operatively connected to switch said control element from said one state to said another state upon said beam engaging said curve;

means for defining a first area in terms of voltage levels around the point of engagement by the beam with said curve;

means for defining a second area in terms of voltage levels where said second area is displaced predetermined horizontal and vertical distances from said first area;

means responsive to said beam reentering in sequence said first and second areas for switching said control element from said another state to said one state; and means responsive to said beam reentering said second area without having first reentered said first area for inhibiting the switching of said control element from said another state to said one state.

References Cited

UNITED STATES PATENTS

| | | | |
|---|---|---|---|
| 3,050,581 | 8/1962 | Bomba et al. | 250–202 |
| 3,213,421 | 10/1965 | Abraham | 250—202 |
| 3,231,860 | 1/1966 | Chatten | 340—146.3 |
| 3,295,105 | 12/1966 | Gray et al. | 340—146.3 |

WALTER STOLWEIN, *Primary Examiner.*

J. D. WALL, *Assistant Examiner.*